United States Patent
Bittner et al.

(10) Patent No.: US 9,664,420 B2
(45) Date of Patent: *May 30, 2017

(54) SYSTEM AND METHOD FOR USING A PHOTOVOLTAIC POWER SOURCE WITH A SECONDARY COOLANT REFRIGERATION SYSTEM

(71) Applicant: Hill Phoenix, Inc., Conyers, GA (US)

(72) Inventors: John D. Bittner, Bethlehem, GA (US); John E. Bittner, Troutville, VA (US)

(73) Assignee: Hill Phoenix, Inc., Conyers, GA (US)

( * ) Notice: Subject to any disclaimer, the term of this patent is extended or adjusted under 35 U.S.C. 154(b) by 603 days.

This patent is subject to a terminal disclaimer.

(21) Appl. No.: 13/908,972

(22) Filed: Jun. 3, 2013

(65) Prior Publication Data
US 2013/0263613 A1    Oct. 10, 2013

Related U.S. Application Data

(63) Continuation of application No. 12/131,457, filed on Jun. 2, 2008, now abandoned.

(51) Int. Cl.
*F25B 27/00* (2006.01)
*F25D 17/02* (2006.01)
(Continued)

(52) U.S. Cl.
CPC .......... *F25B 21/00* (2013.01); *F25B 25/005* (2013.01); *F25B 2600/13* (2013.01); *Y02B 30/745* (2013.01)

(58) Field of Classification Search
CPC ..... H02J 9/061; H02J 1/10; H02J 9/04; Y02B 10/24; Y02B 10/72; F25B 27/005;
(Continued)

(56) References Cited

U.S. PATENT DOCUMENTS 4,100,427 A * 7/1978 Durand ............... H02J 7/35
  136/291
4,783,276 A   11/1988 Bohnenn
(Continued)

OTHER PUBLICATIONS

Brain, Marshall, How Refrigerators Work, How Stuff Works, viewed on Apr. 7, 2008 at http://home.howstuffworks.com/refrigerator.htm/printable, 7 pages.
(Continued)

*Primary Examiner* — Allen Flanigan
*Assistant Examiner* — Filip Zec
(74) *Attorney, Agent, or Firm* — Foley & Lardner LLP

(57) ABSTRACT

A secondary coolant refrigeration system powered primarily by a photovoltaic source and by an alternating current (AC) source as a backup is disclosed. The secondary coolant refrigeration system has a pump for pumping secondary coolant fluid through a secondary coolant fluid loop. The system includes a variable frequency drive for controlling the speed of the pump. The variable frequency drive includes drive circuitry configured to provide variable frequency power to the pump via an output interface. The variable frequency drive also includes a first interface configured to receive power from the photovoltaic source and a second interface configured to receive power from the AC source. The circuit is further configured to cause the variable speed drive to be powered by the photovoltaic source when the power received from the first interface is adequate and by the AC source when the power received from the first interface is not adequate.

11 Claims, 4 Drawing Sheets

(51) Int. Cl.
*G05B 13/00* (2006.01)
*F25B 21/00* (2006.01)
*F25B 25/00* (2006.01)

(58) Field of Classification Search
CPC .. F25B 27/007; F25B 27/002; Y10T 307/336; Y10T 307/505; Y10T 307/367; Y10T 307/615
USPC ...... 62/235.1, 185; 700/275; 307/64–66, 70, 307/72, 73, 80, 81, 87; 363/89, 95, 97, 363/98
See application file for complete search history.

(56) References Cited

U.S. PATENT DOCUMENTS

| | | | |
|---|---|---|---|
| 4,883,823 A * | 11/1989 | Perry, Jr. | C02F 1/047 |
| | | | 518/702 |
| 5,239,838 A | 8/1993 | Tressler | |
| 5,259,731 A | 11/1993 | Dhindsa et al. | |
| 5,889,645 A * | 3/1999 | Kadah | F02D 41/20 |
| | | | 307/139 |
| 6,185,958 B1 | 2/2001 | Wightman | |
| 6,275,403 B1 | 8/2001 | McNulty et al. | |
| 6,393,851 B1 | 5/2002 | Wightman | |
| 6,469,487 B2 | 10/2002 | Ewert et al. | |
| 6,581,398 B2 | 6/2003 | Wightman | |
| 6,847,130 B1 | 1/2005 | Belehradek et al. | |
| 6,870,279 B2 * | 3/2005 | Gilbreth | H02J 1/10 |
| | | | 290/52 |
| 6,951,117 B1 | 10/2005 | Wightman | |
| 7,130,719 B2 | 10/2006 | Ehlers et al. | |
| 7,145,265 B2 | 12/2006 | Mc Nulty et al. | |
| 7,343,226 B2 | 3/2008 | Ehlers et al. | |
| 7,418,311 B1 | 8/2008 | Lagassey et al. | |
| 7,608,947 B2 | 10/2009 | Anderson et al. | |
| 7,859,862 B2 * | 12/2010 | Lin | H02M 3/33523 |
| | | | 363/21.12 |
| 7,888,907 B2 * | 2/2011 | Litovsky | H02J 7/0004 |
| | | | 307/46 |
| 8,044,538 B2 | 10/2011 | Ragonese et al. | |
| 2003/0205053 A1 | 11/2003 | Lane et al. | |
| 2004/0226309 A1 | 11/2004 | Broussard | |
| 2005/0103212 A1 | 5/2005 | Cronin et al. | |
| 2006/0127586 A1 | 6/2006 | Roche et al. | |
| 2007/0070771 A1 | 3/2007 | Joergensen et al. | |
| 2007/0130986 A1 | 6/2007 | Kinser | |
| 2007/0175236 A1 | 8/2007 | Dryzun | |
| 2007/0220911 A1 | 9/2007 | Wightman | |
| 2008/0022695 A1 | 1/2008 | Welle et al. | |
| 2008/0022696 A1 | 1/2008 | Welle et al. | |
| 2008/0060371 A1 | 3/2008 | Jude | |
| 2008/0163628 A1 | 7/2008 | Lilke | |
| 2008/0218917 A1 * | 9/2008 | Archer | H02J 1/10 |
| | | | 361/33 |
| 2008/0288115 A1 | 11/2008 | Rusnak et al. | |
| 2011/0139213 A1 | 6/2011 | Lee | |

OTHER PUBLICATIONS

Danfoss, Refrigerants, Naturally, "Unilever Solar assisted Ice Cream Box With a Danfoss DC operated Propane Compressor", undated, 16 pages.
Kazachki, et al., Secondary Coolant Systems for Supermarkets, Ashrae Journal, Sep. 2006, American Society of Heating, Refrigerating and Air-Conditioning Engineers, Inc., 9 pages.
Powering Pumps up to 600 HP: AquaMaxTM High Yield Irrigation Systems Work in Combination with Existing Grid/Diesel Pumps, Worldwater & Power Corp. © Pennington, New Jersey, www.worldwater.com, no date given, 2 pages.
Price Chopper Goes 'Eco', Frozen Food Age, Jan. 2008, viewed on Apr. 7, 2008 at http://www.frozenfoodage.com/print/Frozen-Food-Age/Price-Chopper-Goes-Eco/1$724, 5 pages.
Carrier Corporation, "Operation and Application of Variable Frequency Drive (VFD) Technology", Oct. 2005, 11 pages.

* cited by examiner

SYSTEM AND METHOD FOR USING A PHOTOVOLTAIC POWER SOURCE WITH A SECONDARY COOLANT REFRIGERATION SYSTEM

CROSS-REFERENCE TO RELATED PATENT APPLICATIONS

This application is a continuation of U.S. application Ser. No. 12/131,457, filed Jun. 2, 2008, incorporated herein by reference in its entirety.

BACKGROUND

The present disclosure relates generally to the field of refrigeration systems. More specifically, the disclosure relates to systems and methods for using a photovoltaic power source with a secondary coolant refrigeration system.

It is well known to provide a refrigeration system including a refrigeration device or temperature controlled storage device such as a refrigerated case, refrigerator, freezer, etc. for use in commercial and industrial applications involving the storage and/or display of objects, products and materials. For example, it is known to provide a refrigeration system with one or more refrigerated cases for display and storage of frozen or refrigerated foods in a supermarket to maintain the foods at a suitable temperature (e.g. 32 to 35 deg F.). In such applications, such refrigeration systems often are expected to maintain the temperature of a space within the refrigerated case where the objects are contained within a particular range that is suitable for the particular objects, typically well below the room or ambient air temperature within the supermarket. Such known refrigeration systems will typically include a heat exchanger in the form of a cooling element or loop within the refrigeration device and provide a flow of a fluid such as a coolant into the cooling element to refrigerate (i.e. remove heat from) the space within the refrigeration device. Various known configurations of refrigeration systems (e.g. direct expansion system and/or secondary system, etc.) are used to provide a desired temperature within a space in a refrigeration device such as a refrigerated case (e.g. by supply of coolant).

In refrigeration systems having a primary loop that circulates a direct expansion type refrigerant that interfaces with, and cools, a liquid coolant in one or more secondary loop(s), the liquid coolant flows through the secondary loops by way of one or more pumps, for example multiple variable speed pumps. The speed of the pump may be adjusted to provide more or less pressure of the coolant in the coolant loops. The motors for the one or more pumps for circulating the liquid coolant though the secondary loops are conventionally powered by an electric alternating current (AC) source such as a power grid.

SUMMARY

One embodiment of the disclosure relates to a secondary coolant refrigeration system powered primarily by a photovoltaic source and by an alternating current (AC) source as a backup. The secondary coolant refrigeration system has a pump for pumping secondary coolant fluid through a secondary coolant fluid loop. The system includes a variable frequency drive for controlling the speed of the pump. The variable frequency drive includes drive circuitry configured to provide variable frequency power to the pump via an output interface. The variable frequency drive also includes a first interface configured to receive power from the photovoltaic source and a second interface configured to receive power from the AC source. The variable frequency drive further includes a circuit configured to switch between providing power to the drive circuitry from the first interface and providing power to the drive circuitry from the second interface. The circuit is further configured to cause the variable speed drive to be powered by the photovoltaic source when the power received from the first interface is adequate and by the AC source when the power received from the first interface is not adequate.

Another embodiment of the disclosure relates to a method for controlling a pump used in a secondary coolant refrigeration system. The speed of the pump is controlled using a variable frequency drive configured to selectively receive power from an AC source and a photovoltaic source. The method includes using the variable frequency drive to determine whether power received from the photovoltaic source is adequate for driving the pump. The method further includes configuring the variable frequency drive to use the power received from the photovoltaic source when the power is adequate for driving the pump. The method yet further includes using the variable frequency drive to switch from using the power received from the photovoltaic source to power received from the AC source when the power received from the photovoltaic source is inadequate for driving the pump.

Another embodiment of the disclosure relates to a system for cooling a plurality of refrigeration loads. The system includes a plurality of secondary coolant fluid loops configured to cool the plurality of refrigeration loads. The system further includes a plurality of coolant pumps, each coolant pump associated with each secondary coolant fluid loop. The system yet further includes a plurality of variable frequency drives, each variable frequency drive configured to controllably drive one of the plurality of coolant pumps and at least one photovoltaic power source. The plurality of variable frequency drives are configured to receive power from the photovoltaic power source and to use the power from the photovoltaic power source to drive the coolant pumps when the power from the photovoltaic power source meets a threshold requirement. Each variable frequency drive is also configured to receive power from a second power source and to use the power received from the second power source when the power from the photovoltaic power source does not meet the threshold requirement.

Alternative exemplary embodiments relate to other features and combinations of features as may be generally recited in the claims.

BRIEF DESCRIPTION OF THE FIGURES

The application will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the application is not limited to the details or methodology set forth in the following description or illustrated in the figures. It should also be understood that the phraseology and terminology employed herein is for the purpose of description only and should not be regarded as limiting.

According to any preferred embodiment, a secondary coolant refrigeration system, and more particularly a variable frequency drive for a pump of the system, is configured to be powered primarily by a photovoltaic power source (e.g., a solar panel). The variable frequency drive is also configured to receive power from an AC source (or a secondary DC power source). During operation, the variable frequency drive is configured to switch from the photovoltaic power source to the AC source if the power received from the photovoltaic power source (or available at the DC source) is inadequate for driving the pump.

Figure 1:
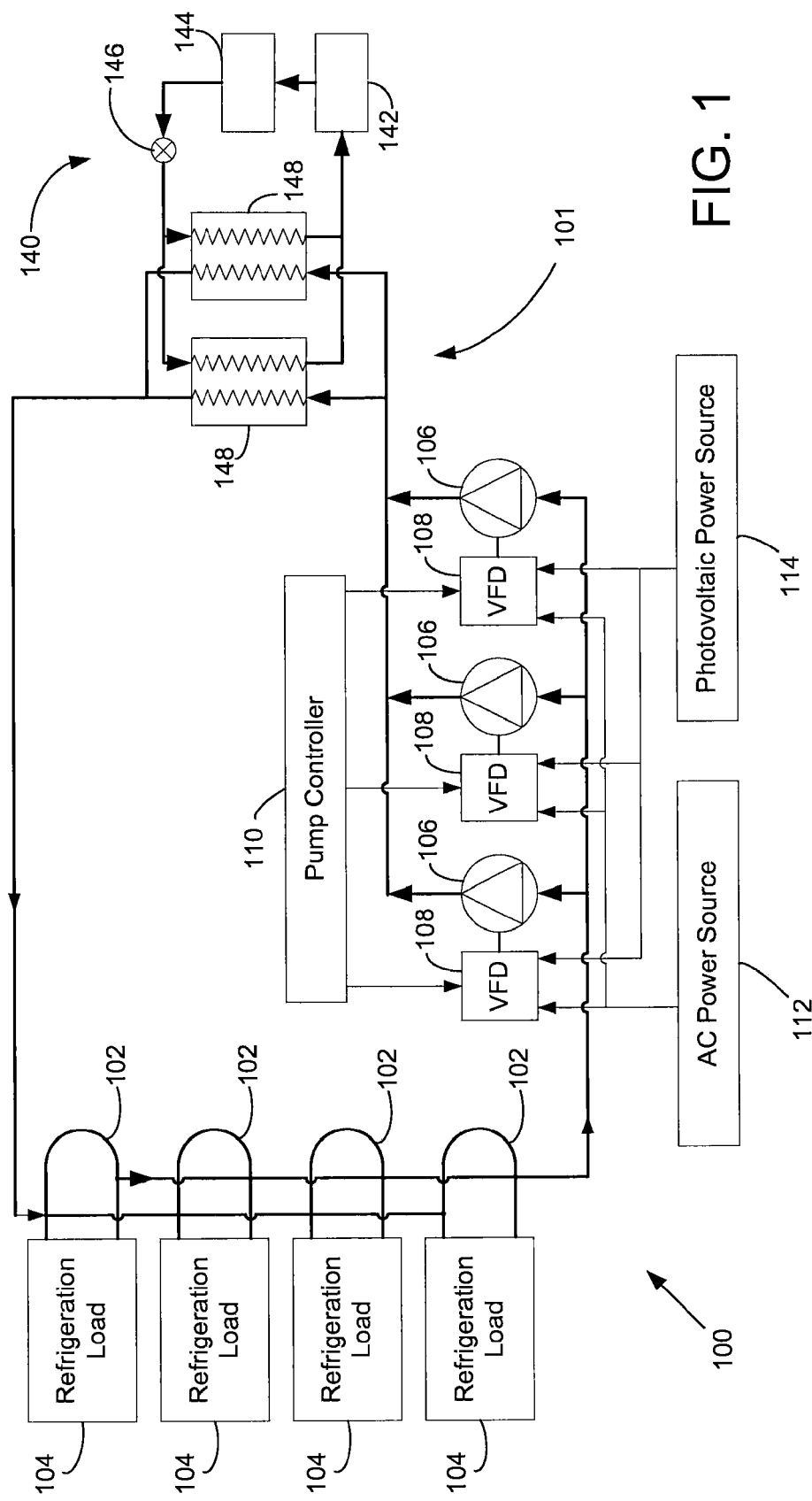
FIG. 1 is a block diagram of a refrigeration system utilizing a secondary coolant system, according to an exemplary embodiment.

Referring to FIG. 1, a block diagram of a refrigeration system 100 utilizing a secondary coolant system 101 is shown, according to an exemplary embodiment. Refrigeration system 100 is configured to provide a cooling function to one or more refrigeration loads 104 by controlling coolant flow through one or more secondary coolant fluid loops 102 (e.g., a hydronic loop, a heat exchange loop, etc.), shown as four loops, associated with refrigeration loads 104. Refrigeration loads 104 may include any of a wide variety of objects to be cooled such as temperature controlled storage devices (e.g., refrigerated display cases, walk-in coolers, etc.). Secondary cooling system 101 also includes one or more pumps 106, one or more variable frequency drives (VFD) 108 associated with pumps 106, and a pump controller 110. Each pump 106 is understood to include a motor that receives the AC electric power from a VFD 108 and converts the electric power to rotational motion of a shaft which drives the pump.

Refrigeration system 100 is also shown to include a primary refrigerant loop 140 for circulating a refrigerant (e.g., a direct expansion type refrigerant, etc.) through a compressor 142 and a condenser 144 and an expansion device 146 to one or more chillers 148 and back to the compressor 142. The chillers 148 are heat exchangers (e.g., plate type heat exchangers or the like) shown to be located "downstream" of the secondary coolant pumps 106 and to provide an interface between the secondary coolant system 101 and the refrigerant of the primary loop 140 to provide "chilling" or cooling of the secondary coolant fluid by the refrigerant.

According to one exemplary embodiment, refrigeration system 100 includes a secondary coolant system 101 with a plurality of branches or loops 102, as may be used in refrigeration of refrigeration loads 104 such as temperature controlled storage devices in facilities such as food retailing outlets (e.g., supermarkets, bakeries, etc.). According to other exemplary embodiments, refrigeration system 100 may be used with another secondary coolant refrigeration system in any commercial, industrial, institutional or residential application or may include one or more loops of a primary coolant refrigeration system. While FIG. 1 illustrates four refrigeration loads 104 and a loop 102 associated with each refrigeration load 104, according to other exemplary embodiments, there may be more or fewer than four loads and/or loops in the system. According to other exemplary embodiments, one loop may be associated with more than one load. According to still other exemplary embodiments, more than one loop may be associated with each load.

Pump 106 is configured to pump a coolant fluid through loops 102 of secondary coolant system 101 to provide cooling to refrigeration loads 104. The coolant fluid may be any fluid capable of absorbing, transporting, and/or emitting heat (e.g., glycol, water, etc.). While FIG. 1 illustrates three pumps, according to other exemplary embodiments, more or fewer than three pumps may be used. According to the exemplary embodiment shown in FIG. 1, pumps 106 are variable speed alternating current (AC) electric motor pumps. Direct current (DC) pumps may be used according to various alternative embodiments. According to an exemplary embodiment, the pump is configured for use in secondary coolant pump applications. Pump 106 may be a pump of any size suitable for its intended application, but according to various exemplary embodiments pump 106 has a horsepower range of 1-20 hp and a voltage range of 208-575 volts AC.

VFD 108 (e.g., adjustable-frequency drive, variable-speed drive, AC drive, microdrive or inverter drive, etc.) is a device configured to control the rotational speed of a pump 106 by controlling the frequency (and thus voltage) of the electrical power supplied to pump 106. While FIG. 1 illustrates a VFD 108 corresponding to each pump 106, according to other exemplary embodiments one VFD may be used to control multiple pumps. According to various exemplary embodiments, the VFD may be a solid state device, for example using a rectifier bridge (e.g., diode bridge). According to other exemplary embodiments, the VFD may include analog circuitry. According to other exemplary embodiments, the VFD may be another type of adjustable speed drive such a slip controlled drive or any other adjustable or variable speed drive.

Pump controller 110 is generally configured to control the fluid flow of coolant through system 101 based on pressure readings from loops 102. Pump controller 110 may control the fluid flow by controlling the speed of each individual pump 106, controlling the sequencing of the pumps, and/or conducting other pump controlling activities. According to various exemplary embodiments, pump controller 110 may be a digital and/or analog circuit. According to other exemplary embodiments, pump controller 110 may include a software controller executed on a processor or other circuit.

Referring still to FIG. 1, VFDs 108 are shown coupled to an AC power source 112 and a photovoltaic power source 114. AC power source 112 may be a power grid (e.g., 1-phase power, 3-phase power, 120-volt AC power, etc.). Photovoltaic power source 114 may be a solar cell, a solar array, a set of solar arrays, or any other photovoltaic modules. Photovoltaic power source 114 may be any photovoltaic power source of the past, present, or future configured to receive solar energy and to output DC electric power.

According to an exemplary embodiment, VFDs 108 are configured to use DC power from photovoltaic power source 114 unless the received power is inadequate. In this event, VFDs 108 are configured to switch from using the DC power from photovoltaic power source 114 to using the AC power from AC power source 112. According to various alternative embodiments, it is important to note that if power from photovoltaic power source 114 is inadequate, VFDs 108 may be configured to switch to alternative power sources other than AC power source 112 (e.g., another DC power source, a back-up battery, one or more capacitors, etc).

Figure 2A:
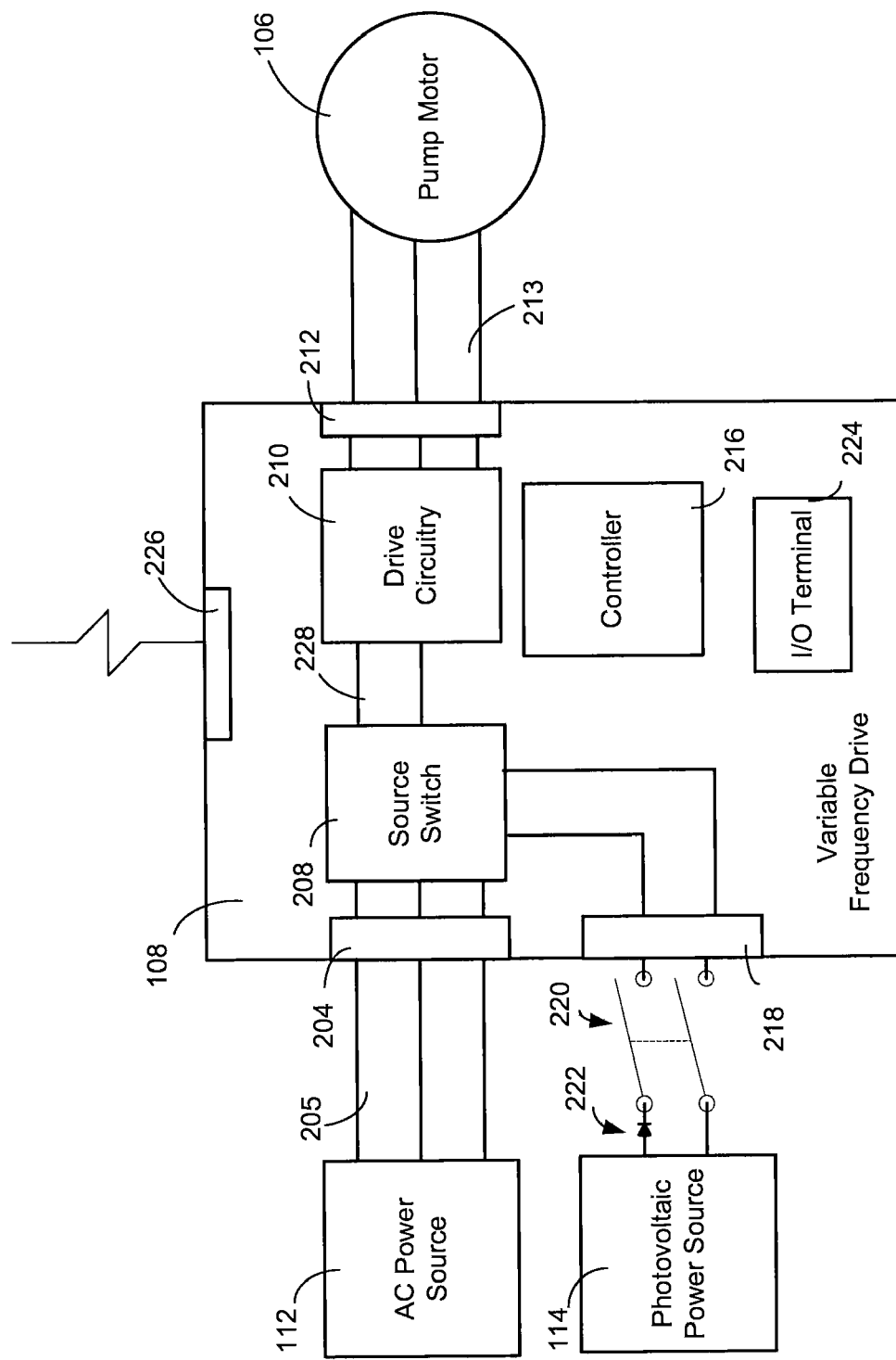
FIG. 2A is a detailed block diagram of a refrigeration system and particularly a variable frequency drive, according to an exemplary embodiment.

Referring now to FIG. 2A, a close-up block diagram of a single VFD 108 connected to power sources 112, 114 and pump motor 106 is shown, according to an exemplary embodiment. VFD 108 is shown to include an AC interface 204, a DC interface 218, and a pump interface 212. VFD 108 is further shown to include a source switch 208, drive circuitry 210, a controller 216, an input/output (I/O) terminal 224, and a control interface 226. According to an exemplary embodiment, the components of VFD 108 are located together and are surrounded by a housing (e.g., a plastic housing, a metal housing, etc.).

Source switch 208 is configured to switch between different power sources such as AC power source 112 and photovoltaic power source 114. Source switch 208 may be implemented in a number of different ways. For example, a one or more diodes (or gates created using other electrical components) may be used between the photovoltaic power source 114 and the drive circuitry to allow or deny the flow of current from photovoltaic power source 114 to drive circuitry 210.

AC interface 204 and DC interface 218 may be or include any number of jacks, terminals, receptacles, or other structures configured to receive cabling from power sources 112, 114. AC interface 204 and DC interface 218 may also include circuitry configured to, for example, limit the current received from the power sources, sense or detect the voltage available from the power sources, convert the AC to DC, invert the DC to AC, and/or to conduct other filtering, limiting, sensing, or converting activities on received power. Any number of protection or safety mechanisms such as diode 222 and/or switch 220 (e.g., fuse, circuit breaker, etc.) may also or alternatively be provided between power sources 112, 114 and VFD 108. AC interface 204 is shown as connected to AC power source 112 by AC cabling 205. Similarly, pump interface 212 is shown as connected to pump motor 106 by AC cabling 213.

Drive circuitry 210 is configured to receive input from power bus 228, to controllably vary the frequency of the power, and to provide the power to the output interface 212. Power bus 228 may be a DC power bus and source switch 208 may include a converter that converts power received from AC power source 112 to DC (if the photovoltaic power source 114 is not being utilized). Drive circuitry 210 may include an inverter circuit with pulse width modulation voltage control, providing quasi-sinusoidal AC output. Drive circuitry 210 may include an embedded microprocessor or may be controlled by controller 216.

Referring still to FIG. 2A, the decision regarding whether to switch from DC to AC and vice-versa may occur via controller 216. According to yet other exemplary embodiments, the decision regarding whether to switch may be accomplished via a logic circuit that is a part of source switch 208. Controller 216 may be a field programmable gate array (FPGA), an application specific integrated circuit (ASIC), a general purpose microcontroller configurable via computer code stored in memory, and/or any other combination of circuitry. Controller 216 and/or other control circuitry of VFD 108 may be powered by battery, an auxiliary AC input, AC power source 112 (even if photovoltaic power source 114 is being used to drive the pump, etc.). Controller 216 may be integrated with source switch 208 (e.g., circuitry of source switch 208 and/or of interfaces 204, 218). According to an exemplary embodiment, controller 216 makes a determination and controls a switch from photovoltaic power source 114 to AC power source 112 in an automated fashion (e.g., does not require human input before each switch).

Controller 216 may be configured to conduct any number of activities to determine whether or not to switch from DC to AC. Controller 216 may be configured to determine whether the power received from DC interface 218 is adequate by comparing the power received at DC interface 218 to the power received at AC interface 204. Controller 216, for example, may be configured to determine that the power received from DC interface 218 is adequate when voltage at DC interface 218 is equal to or greater than the voltage at AC interface 204. According to yet other exemplary embodiments, controller 216 may be configured to determine that the power received from DC interface 218 is adequate when voltage at DC interface 218 is measured to be some multiple of voltage measured at AC interface 204 (e.g., at least 1.35 times higher, etc.). According to other exemplary embodiments, controller 216 may be configured to determine whether the power received from the DC interface 218 is adequate for driving pump 106 by comparing voltage from the DC interface 218 to a threshold value (e.g., 400 VDC, etc.) or a setpoint of pump 106 (e.g., as read and/or received from controller interface 226).

According to an exemplary embodiment, controller 216 is configured to seamlessly switch from using DC power to using AC power, and vice-versa. In other words, controller 216 may be configured to transition from power source to power source in a manner that is transparent to end users. Controller 216 may be configured so that manual input, user input, or any other outside input (e.g., from pump controller 110 shown in FIG. 1) is not required for the switching to occur. A smooth transition may be restored, for example, by receiving power from both the AC power source 112 and the photovoltaic power source 114 for a brief period of time (e.g., input from AC source 112 is converted to DC and is provided in parallel to the DC from the photovoltaic power source 114 to drive circuitry 210). According to other various exemplary embodiments, the switch from DC to AC is timed so that the delay between switching the DC off and providing the AC to the drive circuitry is small (e.g., less than 100 milliseconds). According to various exemplary embodiments, the DC to AC transition is accomplished at different rates or via different methods but the transition is still smooth so as to not effect the operation of the pump in a significant manner (e.g., not require the pump system to oscillate in order to re-obtain a lost setpoint).

VFD 108 is further shown to include I/O terminal 224. I/O terminal 224 may be or include one or more user controls built-into VFD 108. For example, I/O terminal 224 may include any number of buttons, keys, switches, potentiometers, displays, or the like for receiving tactile input from a user. For example, VFD 108 may be configured to receive input from a user so that the user may adjust a threshold value used in the determination of whether the DC power is sufficient. According to various other exemplary embodiments, I/O terminal 224 may be used to wire VFD 108 to an external user input device (e.g., a terminal, a keyboard, etc.). Control signals may also be provided to VFD 108 (e.g., from pump controller 110) via control interface 226. Control interface 226 may include one or more jacks, terminals, receptacles, or other structures for receiving signals from another controller.

According to various exemplary embodiments, VFD 108 shown in FIG. 2A may be configured so that power received from photovoltaic power source 114 cannot be provided to AC power source 112 (i.e., VFD 108 does not include a "grid tied" inverter configured to provide power from the photovoltaic power source 114 back to the power grid). In this and other embodiments, VFD 108 may be configured or adjusted to accept a wide range of voltage levels from variously sized photovoltaic power sources (e.g., up to and/or greater than 800 VDC). According to an exemplary embodiment, VFD 108 (and/or the photovoltaic power source 114) may include components for converting excess power to heat and/or for storing excess power received from photovoltaic power source 114 for later use (e.g., in one or more coupled batteries or capacitor banks) Further, VFD 108 and/or pump 106 may be configured for regenerative braking so that some kinetic energy of the system is stored and/or otherwise reused. For example, if a pump is commanded to slow down, kinetic energy from the pump system may be extracted from the pump system, converted to electrical power, received by the variable frequency drive, and stored in a battery system for later use.

According to an alternative exemplary embodiment, VFD 108 includes a grid tied inverter and is configured to provide power back to the power grid in the event that the photovoltaic power source is providing more power than the variable frequency drive needs to drive the pump.

Figure 2B:
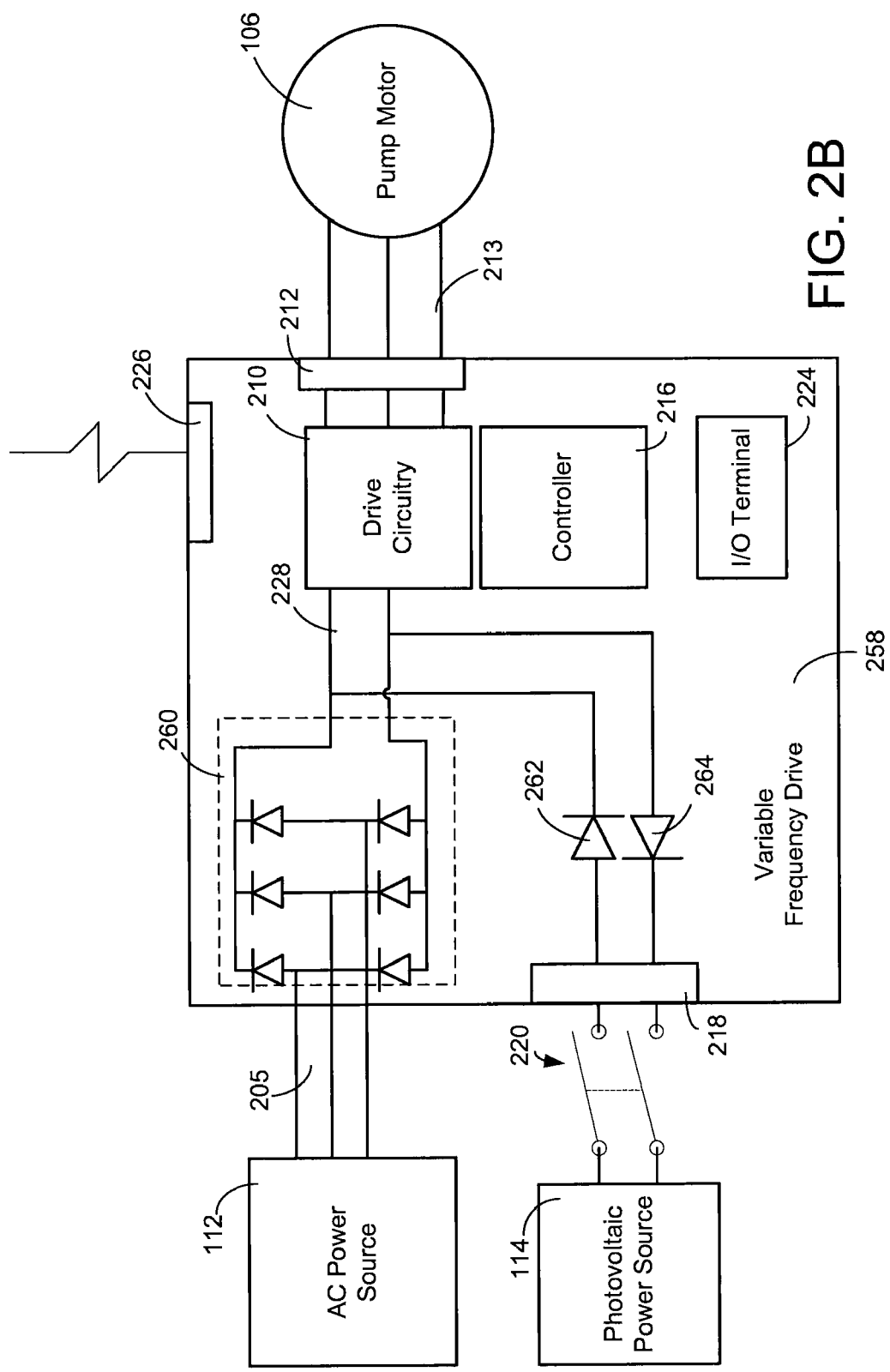
FIG. 2B is a detailed block diagram of a refrigeration system and particularly a variable frequency drive, according to another exemplary embodiment.

Referring now to FIG. 2B, a diagram of VFD 258 connected to power sources 112, 114 and pump motor 106 is shown. According to the exemplary embodiment shown in FIG. 2B, VFD 258's switch for transitioning from DC power received via photovoltaic power source 114 and AC power source 112 is the combination of rectifier bridge 260 and diode 262. Diode 262 is configured to have an "on-voltage" (i.e., "cut-in voltage") that is about 1.35 times the expected voltage from AC power source 112. Diode 264 is a redundant diode used to protect the photovoltaic power source 114 if diode 262 fails. It should be noted that the system will operate with a diode in the position of diode 262, 264, or both. It should further be noted that a circuit different than diode 262 (and/or diode 264) may be provided to VFD 258, the circuit configured to allow current to flow to DC bus 228 when voltage from photovoltaic power source 114 is sufficiently high. Referring further to the exemplary embodiment shown in FIG. 2B, when the voltage from photovoltaic power source 114 is sufficiently high relative to voltage from rectifier bridge 260, diode 262 allows current to flow from photovoltaic power source 114 to DC bus 228. In this embodiment, rectifier bridge 260 is configured to impede the flow of current from AC power source 112 to DC bus 228 when voltage from photovoltaic source 114 is greater than that available from rectifier bridge 260 (e.g., the diodes of rectifier bridge 260 do not meet their "cut-in voltage" due to the potential available on DC bus 228 from photovoltaic power source 114 being larger than that available from DC power source). According to various exemplary embodiments, the diodes of rectifier bridge 260 are sized so that they do no break down even if photovoltaic power source 114 is providing its maximum voltage.

In the exemplary embodiment illustrated in FIG. 2B, no active switches are used to switch from photovoltaic power source 114 to AC power source 112. Rather, the diodes (e.g., diode 262, the diodes of rectifier bridge 260) are configured to behave similar to check valves. Current only flows in one direction, anode to cathode. The switching between photovoltaic power source 114 and AC power source 112 is automatically conducted depending on the voltage of the sources and the properties of the diodes. According to an exemplary embodiment, the diodes are configured so that the following results occur: 1) if the voltage of the photovoltaic source is greater than (1.35*voltage from the AC power source 112), then current will flow from the photovoltaic source; 2) if the voltage of the photovoltaic source 114 is less than (1.35*voltage from the AC power source 112), then current will flow from AC power source 112; 3) if the voltage of the photovoltaic source 114 is equal to (1.35*the voltage from the AC power source 112), then current will flow from both sources. According to an exemplary embodiment, if single phase AC power source 112 is used, then the above equations will use 0.9 rather than 1.35. According to an exemplary embodiment, thresholds of 1.35*AC Voltage and 0.9*AC Voltage may change in different embodiments depending on the circuits and diodes used.

It is important to note that while three phase AC power, a rectifier bridge suitable for three phase AC power, and a three phase motor are shown in the drawings, a single phase motor, inverter, rectifier bridge, and/or AC power source may alternatively be used.

Figure 3:
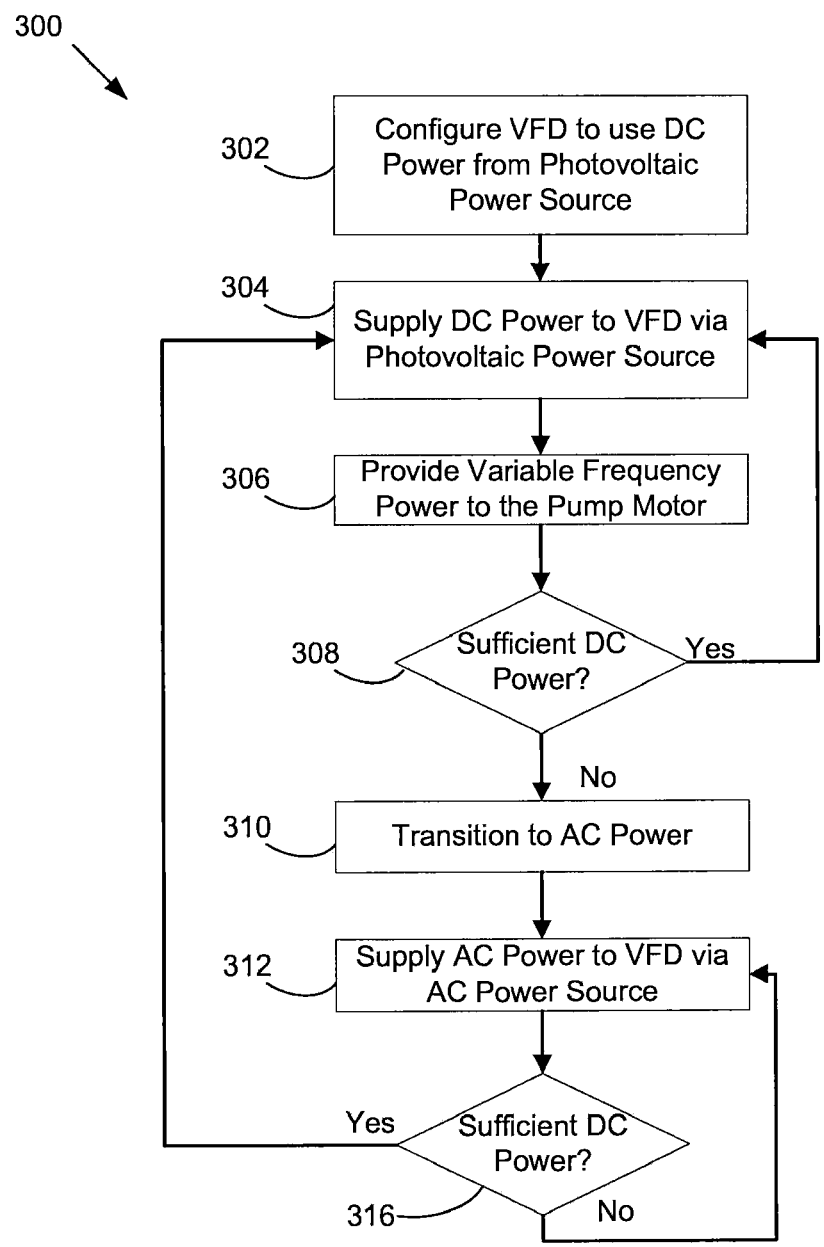
FIG. 3 is a flow chart of a process for controlling a pump used in a secondary coolant refrigeration system, according to an exemplary embodiment.

Referring now to FIG. 3, a flow chart of a process 300 for controlling a pump used in a secondary coolant refrigeration system is shown, according to an exemplary embodiment. Process 300 is shown to include configuring the VFD to use DC power from the photovoltaic power source (step 302). Step 302 may include any number of user input or adjustment steps. For example, step 302 may include selecting, providing, and connecting the photovoltaic power source to the VFD. The photovoltaic power source may be selected so that the output (e.g., output voltage range) is within the range of acceptable DC input for the VFD. Depending on the output characteristics of the photovoltaic power source, one or more thresholds or bias settings of the VFD may be adjusted so that the VFD does not switch from DC to AC power too frequently. Further, computer code or other variables stored in memory of the VFD may be adjusted via one or more user interfaces.

Process 300 is further shown to include supplying DC power to the VFD via the photovoltaic power source (step 304). Step 304 may include a number of steps including a step of allowing current to flow (e.g., via a gate, controlled diode, rectifier bridge, and/or switch) from the DC source to the drive circuitry of the VFD. The VFD provides variable frequency power to the pump motor (step 306) as long as the DC power is sufficient for driving the pump (e.g., driving the pump though its intended range of operation, driving the pump at the current setpoint, etc.).

While the variable frequency power is provided from the VFD to the pump motor, the VFD may be configured to check, measure, and/or determine (e.g., continuously, at an interval, etc.) whether the DC power provided by the photovoltaic power source is sufficient (step 308). Step 308 may include any number of comparing steps (e.g., comparing the power available from the DC power source to the power available from the AC power source, comparing the power available from the DC power source to a threshold, determining if a pump setpoint is attainable and/or maintainable using the DC power source, etc.).

If the DC power is sufficient, the VFD will continue to utilize power from the photovoltaic power source (e.g., loop back to step 304). If DC power is determined to be insufficient, the VFD is configured to begin a process of switching and/or transitioning to AC power (step 310).

The step of transitioning to AC power (step 310) may include any number of shut-off, current limiting, disconnecting, and/or other techniques relative to the DC power source and any number of turn-on, current-allowing, connecting, and/or other techniques relative to the AC power source. The step of transitioning (step 310) may be gradual, nearly immediate, or otherwise. Further, step 310 may also include any number of setting adjustments in memory of the VFD and/or via hardware. For example, the bias of a diode may be reversed, a different software routine may be initiated, a variable in memory may be set, etc. After (and/or during) the transition to AC power, the power will be supplied to the VFD via the AC power source (step 312). While AC power is being utilized by the VFD, the VFD may regularly or continuously check for whether the DC power has returned to a sufficient level for driving the pump (step 316). Program logic and/or circuitry within the VFD may be configured to immediately affect a switch to DC power if a threshold is reached. According to other exemplary embodiments, the switch may be affected only if the threshold has been reached and maintained for a period of time (e.g., seconds, minutes, etc.). According to yet other exemplary embodiments, program logic will examine other characteristics of the DC power or the VFD (e.g., volatility, a standard of deviation, an average voltage measurement, a root mean squared measurement, the number of times switched to AC power during the day, the setpoint of the pump, a measurement of the associated refrigerator load, etc.) before switching back from AC to DC. While DC power is determined to be insufficient, the AC power source will continue supplying the driving power to the VFD (e.g., via a loop back to step 312, etc.).

It is important to note that the construction and arrangement of the elements of the refrigeration system are illustrative only. Although only a few exemplary embodiments of the present disclosure have been described in detail in this disclosure, those skilled in the art who review this disclosure will readily appreciate that many modifications are possible in these embodiments (such as variations in features such as components, formulations of coolant compositions, heat sources, orientation and configuration of the cooling elements, the location of components and sensors of the cooling system and control system; variations in sizes, structures, shapes, dimensions and proportions of the components of the system, use of materials, colors, combinations of shapes, etc.) without materially departing from the novel teachings and advantages of the disclosure. For example, closed or open space refrigeration devices may be used having either horizontal or vertical access openings; cooling elements may be provided in any number, size, orientation and arrangement to suit a particular refrigeration system; and the system may include a variable speed fan, under the control of the pump control system or otherwise.

Thresholds and/or set points of the controller or the switch may be determined empirically or predetermined based on operating assumptions relating to the intended use or application of the pump, variable frequency drive, and/or the refrigeration devices. According to other alternative embodiments, the refrigeration system may be any device using a refrigerant or coolant, or a combination of a refrigerant and a coolant, for transferring heat from one space to be cooled to another space or source designed to receive the rejected heat and may include commercial, institutional or residential refrigeration systems. Further, it is readily apparent that variations of the refrigeration system and its components and elements may be provided in a wide variety of types, shapes, sizes and performance characteristics, or provided in locations external or partially external to the refrigeration system. Accordingly, all such modifications are intended to be within the scope of the disclosure.

It should further be noted that the variable frequency drive described herein and the switching activity from a photovoltaic power source to an AC power source may be applicable in some applications other than the secondary coolant refrigeration application.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

Embodiments within the scope of the present disclosure include program products comprising machine-readable media for carrying or having machine-executable instructions or data structures stored thereon (e.g., program products/software for controlling variable frequency drives). Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

What is claimed is:

1. A refrigeration system powered primarily by a photovoltaic source and by an alternating current (AC) source as a backup, the refrigeration system having a primary loop and a secondary loop, the refrigeration system having a pump for pumping coolant fluid through the secondary loop, the system comprising:
   a variable frequency drive for controlling the speed of the pump, the variable frequency drive comprising:
      drive circuitry configured to provide variable frequency power to the pump via an output interface;
      a first interface configured to receive power from the photovoltaic source;
      a second interface configured to receive AC power from the AC source;
      a DC bus coupled to the drive circuitry and configured to transmit power to the drive circuitry;
      a rectifier coupled to the second interface and to the DC bus, wherein the rectifier is configured to receive the AC power from the AC source, convert the AC power into DC power, and transmit the DC power to the drive circuitry via the DC bus; and
      a diode coupled to the first interface and to the DC bus, the diode having a cut-in voltage of at least 1.35 times an expected voltage of the AC source, wherein the diode is configured to receive the power from the photovoltaic source and transmit the power to the drive circuitry via the DC bus, wherein the rectifier and the diode are configured to switch between providing power to the drive circuitry from the first interface and providing power to the drive circuitry from the second interface, and wherein the rectifier and the diode are configured to cause the drive circuitry to be powered by power received at the first interface when a voltage of the photovoltaic source is greater than the cut-in voltage of the diode and to be powered by power received at the second interface when the voltage of the photovoltaic source is less than a voltage of the AC source and when the voltage of the photovoltaic source is greater than the voltage of the AC source but less than the cut-in voltage of the diode.

2. The refrigeration system of claim 1, wherein the rectifier and the diode are configured to cause the switch between the first interface and the second interface to be smooth so that operation of the pump is not interrupted.

3. The refrigeration system of claim 1, wherein the switching is automated and does not require human input before each switch.

4. The refrigeration system of claim 1, wherein the rectifier and the diode are configured to determine whether the power received from the first interface is adequate to power the drive circuitry by comparing the power received at the first interface to the power received at the second interface.

5. The refrigeration system of claim 1, wherein the rectifier and the diode are configured to determine that the power received from the first interface is adequate to power the drive circuitry when voltage at the first interface is at least 1.35 times higher than voltage at the second interface.

6. The refrigeration system of claim 1, wherein the rectifier and the diode determine whether the power received from the first interface is adequate to power the drive circuitry by comparing voltage from the first interface to a threshold value.

7. The refrigeration system of claim 6, wherein the variable frequency drive further comprises an input for receiving a signal from a user interface and wherein the controller is further configured to adjust the threshold value based on the received signal.

8. The refrigeration system of claim 1, further comprising:
wherein the pump is one of a plurality of pumps for pumping coolant fluid; and
wherein the variable frequency drive is one of a plurality of variable frequency drives, each variable frequency drive configured to drive one of the plurality of pumps, wherein each variable frequency drive is configured to receive power from the photovoltaic source or another photovoltaic source by default.

9. The secondary coolant refrigeration system of claim 1, wherein the DC bus couples the second interface to inverter circuitry of the variable frequency drive, and wherein the output from the cathode of the diode is connected to the DC bus.

10. The refrigeration system of claim 1, further comprising a programmable controller configured to control whether power is received by the drive circuitry from the first interface or the second interface.

11. A system for cooling a plurality of refrigeration loads, the system comprising:
a plurality of secondary coolant fluid loops configured to cool the plurality of refrigeration loads;
a plurality of coolant pumps, each coolant pump associated with at least one secondary coolant fluid loop;
a plurality of variable frequency drives, each variable frequency drive configured to control and drive one of the plurality of coolant pumps;
at least one photovoltaic power source; and
at least one diode configured to provide power from the at least one photovoltaic power source to the plurality of coolant pumps, the diode having a cut-in voltage of at least 1.35 times an expected voltage of a second power source;
wherein the plurality of variable frequency drives are configured to receive power from the photovoltaic power source and to use the power from the photovoltaic power source to drive the coolant pumps when a voltage of the photovoltaic power source is greater than the cut-in voltage of the diode, and
wherein each variable frequency drive is also configured to receive power from the second power source and to use the power received from the second power source when the voltage of the photovoltaic power source is less than a voltage of the second power source and when the voltage of the photovoltaic source is greater than the voltage of the second power source but less than the cut-in voltage of the diode, wherein the cut-in voltage is a minimum voltage requirement and wherein the second power source is one of grid power and a battery backup source, wherein a separate photovoltaic power source is provided for each of the variable frequency drives.

* * * * *